United States Patent
Maeno

[11] Patent Number: 5,926,661
[45] Date of Patent: Jul. 20, 1999

[54] CAMERA USING SECONDARY BATTERY

[75] Inventor: Hitoshi Maeno, Hachioji, Japan

[73] Assignee: Olympus Optical Co., Ltd., Tokyo, Japan

[21] Appl. No.: 08/982,887

[22] Filed: Dec. 2, 1997

Related U.S. Application Data

[30] Foreign Application Priority Data

Dec. 16, 1996 [JP] Japan .................................. 8-335733

[51] Int. Cl.[6] ...................................................... G03B 7/26
[52] U.S. Cl. .......................................... 396/277; 396/303
[58] Field of Search .................................. 396/277, 278, 396/279, 301, 303, 85, 206, 205, 406, 302

[56] References Cited

U.S. PATENT DOCUMENTS 4,260,230  4/1981  Suzuki ...................................... 396/301

FOREIGN PATENT DOCUMENTS 5-49181   2/1993  Japan .
5-249537  9/1993  Japan .

*Primary Examiner*—W. B. Perkey
*Attorney, Agent, or Firm*—Frishauf, Holtz, Goodman, Langer & Chick

[57] ABSTRACT

In this invention, there is provided a camera using a secondary battery as a power source and including load means such as a flash device or motor driven by use of electric energy of the secondary battery, charging means having a charging control circuit for charging the secondary battery with electric energy supplied from an external power source provided on the exterior of the secondary battery, and a camera control circuit for "exclusively" driving and controlling the charging means and load means by use of an EEPROM as storage means, wherein the size of the camera is small, circuit protection can be attained, the precision of a specified voltage of a protection circuit on the secondary battery side is high, the design is simplified, and the manufacturing process and adjustment process can be simplified.

22 Claims, 6 Drawing Sheets

CAMERA USING SECONDARY BATTERY

BACKGROUND OF THE INVENTION

This invention relates to a chargeable camera using a secondary battery.

Generally, in a photographing equipment using a secondary battery, a protection circuit for protecting circuits contained therein from overcharge or overdischarge is provided. A control circuit for the main body of a camera and a control circuit for charging of the secondary battery are separately formed and preset information items are exchanged between the circuits. For example, in a device using a secondary battery pack proposed in Jpn. Pat. Appln. KOKAI Publication No. 5-249537, a first CPU on the main body side of the camera and a second CPU on the secondary battery pack side are separately provided and the CPUs are constructed to control the camera and the charging operation of the secondary battery, respectively. If level signals of current values used which correspond to plural types of electrical load means are supplied to the second CPU, the second CPU controls the charging or discharging operation based on the level signal.

As one example of a protection circuit for preventing overcharge or overdischarge in the charging operation of the secondary battery, an overcharge protection circuit and overdischarge protection circuit constructed by using an overcharge detection comparator, overdischarge detection comparator and power MOSFET as is disclosed in Jpn. Pat. Appln. KOKAI Publication No. 5-49181 are provided, for example. In this construction, each charge protection circuit and the control circuit for the equipment are separated from each other.

However, since the control means are respectively provided on the camera side and on the secondary battery side in the device disclosed in Jpn. Pat. Appln. KOKAI Publication No. 5-249537, an additional circuit for making connection with them is required, and as a result, the scale of the device tends to become large. Further, if the load means and the charging means are simultaneously operated, there occurs a possibility that a large current flows from the external power source into the charging control circuit to damage the charging control circuit and others. Generally, dispersion in the operation voltages of the protection circuits will be finally determined by the precision of the parts constructing the device in many cases and the set value cannot be uniformly determined. Therefore, if an adjustment based on the uniformly determined value is made, the dispersion cannot be completely compensated for and it becomes more difficult to adjust the individual devices after the assembling and mounting processes.

As described above, in the conventional equipment and device using the secondary batteries, the circuit scale tended to become large, the mounting space became large and the cost of parts became high so that a reduction in the size and a lowering in the cost were automatically limited. Further, for the adjusting operation of the charging control section in the manufacturing process, it became necessary to adequately select constituent parts and make an optimum combination thereof. Further, since an adjustment after the mounting and manufacturing processes was difficult, the number of designing steps and the assembling cost for ensuring the precision of the product were increased accordingly. In addition, a design made by taking protection of the circuit provided for preventing overcharge or the like into consideration was required and the design tended to become complicated.

This invention has been made to solve the above problems and an object of this invention is to provide a camera using a secondary battery in which the cost can be lowered by realizing a camera in which the size is made small, the charging control circuit can be protected and the precision of a specified voltage of the protection circuit on the secondary battery side is made high, simplifying the design of the camera and simplifying the manufacturing process and adjustment after the manufacturing process.

BRIEF SUMMARY OF THE INVENTION

In order to solve the above problems and attain the above object, a camera of this invention has the following means. That is, a camera includes a flash device, load means such as a motor and battery checking circuit associated with the camera operation, a secondary battery used as a power source of the camera operation, charging means for the secondary battery, one camera control means for exclusively controlling the load means and charging means, and storage means capable of storing both of adjustment data associated with the control of the camera operation and adjustment data associated with the control of charging of the secondary battery. Further, inherent adjustment data for an equipment and device assembled in a preset manufacturing process is previously stored in the storage means and the camera is constructed such that an adjustment can be made based on the data stored in the storage means.

A camera using a secondary battery as a power source is provided which includes charging means for charging the secondary battery with electric energy supplied from an external power source provided on the exterior of the camera; load means driven by use of the electric energy of the secondary battery charged by the charging means; and control means for exclusively driving and controlling the charging means and load means.

There is provided a camera which includes a charging control circuit for charging a secondary battery; and a camera control circuit for controlling the operation of the camera and the charging control circuit; wherein the charging control circuit transmits a charging request signal to the camera control circuit when an external power source for charging the secondary battery is attached and the camera control circuit effects the control operation to permit the secondary battery to be charged if a preset device is not operated when the charging request signal is received.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

There will now be described embodiments of this invention with reference to FIGS. 1 to 9.

(First Embodiment)

Figure 1:
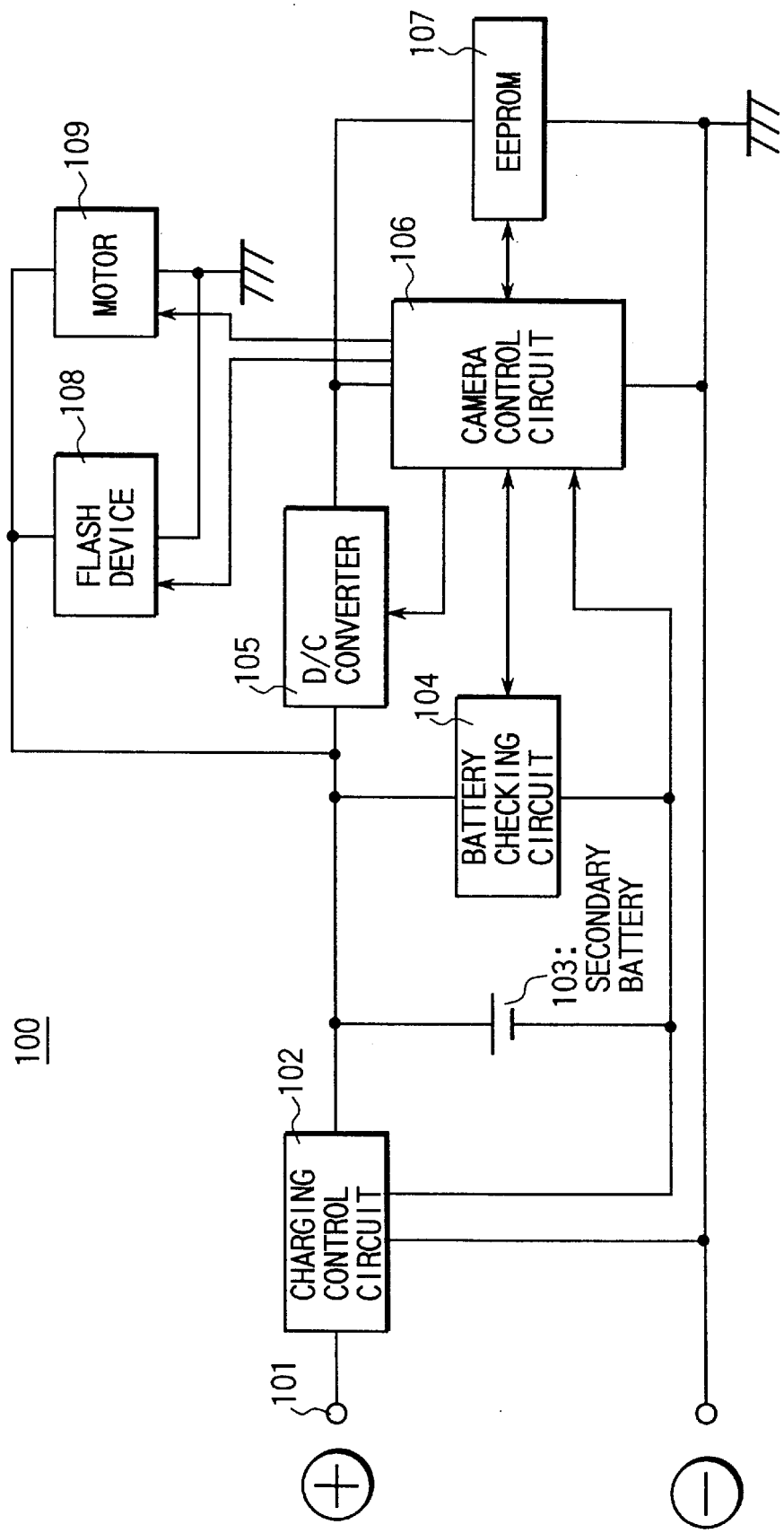
FIG. 1 is a block diagram showing the schematic construction of a camera according to a first embodiment of this invention.

The basic construction of a camera according to a first embodiment of this invention is schematically shown by a block diagram in FIG. 1. A charging terminal 101 of the camera is connected to an external power source (not shown). A charging control circuit 102 controls and converts energy supplied via the charging terminal 101 into a current or voltage suitable for charging a secondary battery 103. In a case where the secondary battery 103 is a lithium-ion secondary battery, the charging control of "constant-current/constant-voltage charging" system is generally used, and in a case where the secondary battery is a Ni—Cd·Ni-hydrogen battery, the charging control of "–Δ V" system is generally used.

The charging control circuit 102 is connected to a camera control circuit 106 and can effect the charging operation in response to an instruction from the camera control circuit 106 and transmit the charging state to the camera control circuit 106.

Energy charged on the secondary battery 103 is used for operating load means of a camera such as a flash device and motor as will be described later, for example. A battery check circuit 104 is used to measure the remaining capacity of the secondary battery 103 and is also used to detect the charging amount (e.g., detect the full-up-charge) during the charging operation of the secondary battery 103.

A voltage output from the secondary battery 103 is raised by a DC/DC converter 105 and then supplied to the camera control circuit 106. If the voltage output from the secondary battery 103 is sufficiently high, it is not necessary to raise the voltage by use of the DC/DC converter 105, but in a case where the voltage output from the secondary battery 103 is lowered and becomes lower than the minimum operation voltage of the camera control circuit 106 when a heavy load is operated, for example, the voltage raising operation by the DC/DC converter 105 becomes necessary.

The camera control circuit 106 controls the camera operation such as the photographing operation and the battery checking operation and controls the charging operation of the charging control circuit 102. Further, an EEPROM 107 used as storage means is connected to the camera control circuit 106 and data necessary for control of the camera operation and charging control of the secondary battery is stored in the EEPROM 107.

Next, various data items stored in the EEPROM 107, for controlling the camera operation and data for charging control of the secondary battery are concretely explained. As data for controlling the operation of the camera, data used for controlling the flash device is first given, but among the necessary data items, particularly, data used for charging control, for example, data set for the charging/discharging operation is explained.

Figure 6:
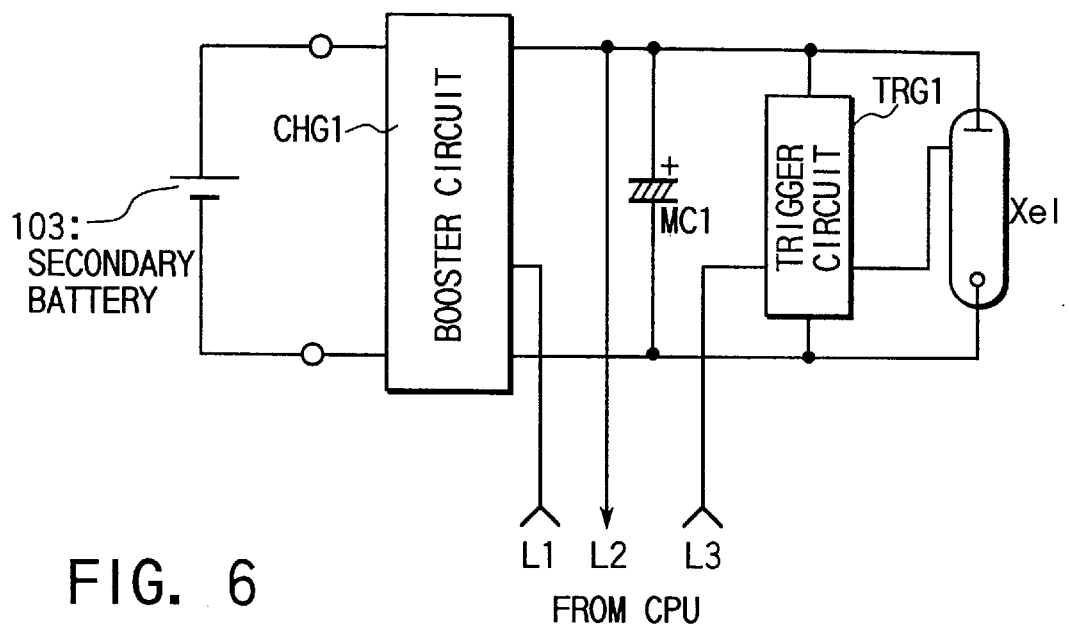
FIG. 6 is a schematic construction diagram showing the construction of a flash device.

The internal construction of a flash device 108 is shown in FIG. 6. Power supplied from the secondary battery 103 is raised or boosted by a booster circuit CHG1 and charged on a main capacitor MC1. The starting or interruption of the booster circuit is made by controlling the voltage level at a terminal L1 and the terminal L1 is connected to the camera control circuit 106. When the camera control circuit 106 sets the voltage at the terminal L1 to the "L (Low)" level, the charging operation is started and when it sets the voltage at the terminal L1 to the "H (High)" level, the charging operation is interrupted. The voltage on the main capacitor MC1 during the charging. operation can be detected by measuring the potential on a terminal L2 by use of the camera control circuit 106. In order to activate the flash device 108, a terminal L3 connected to the camera control circuit 106 is set to the "L" level. A trigger circuit TRG1 is activated to trigger a light emission tube Xe1. Power charged on the main capacitor MC1 is discharged via the light emission tube Xe1 to emit light.

Figure 7:
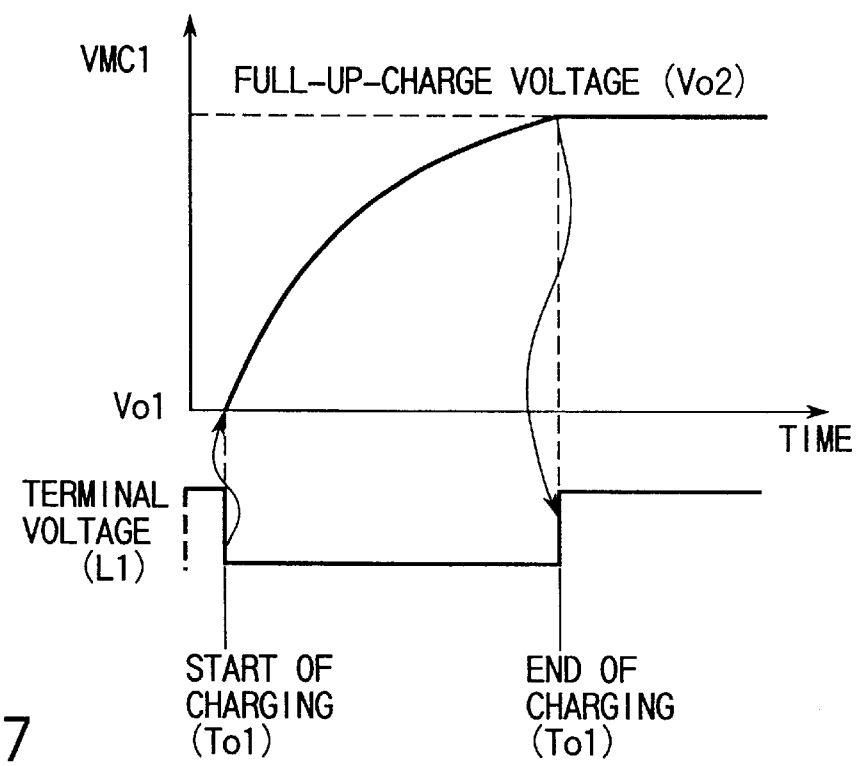
FIG. 7 is a graph showing the charging process in the main capacitor of the flash device.

Next, the charging control in the flash device is explained with reference to a graph shown in FIG. 7. The abscissa of the graph indicates time and the ordinate indicates a voltage VMC1 on the main capacitor MC1. Assume now that the initial voltage of the main capacitor MC1 obtained immediately before starting the charging operation is set to V01. In order to start the charging operation at a certain time (T01), the voltage at the terminal L1 is set to the "L" level. As a result, since the operation of the booster circuit CHG1 is started, the voltage of the main capacitor MC1 starts to rise as shown in FIG. 7. The camera control circuit 106 compares the present voltage VMC1 with a preset "full-up-charge voltage" V02 which is previously set and interrupts the charging operation by setting the voltage at the terminal L1 to the "H" level at the time (T02) when VMC1 becomes equal to or higher than V02.

In the charging control operation of the flash device 108, the "full-up-charge voltage" V02 is stored in the EEPROM 107 as one of the control data items for the camera operation.

Figure 8:
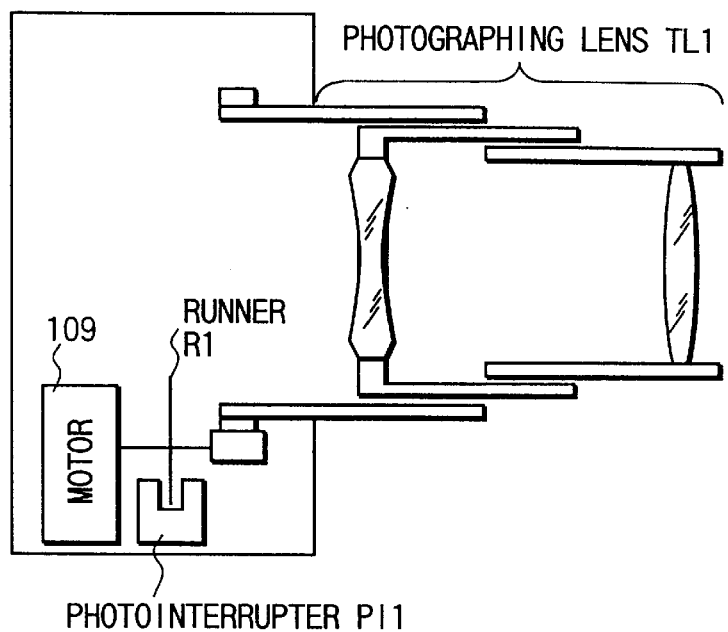
FIG. 8 is a schematic structural diagram showing the internal structure of a zoom driving mechanism.

Next, data associated with the zoom driving control operation of the photographing lens as one of the operations of the camera using a motor 109 shown in FIG. 8 as a driving source is explained.

FIG. 8 schematically shows one example of the structure of a zoom driving mechanism. In this example, when the driving force of the motor 109 is transmitted to a photographing lens TL1, the zooming operation can be effected. A runner R1 having a preset slit (not shown) formed in the outer peripheral portion thereof is mounted on the output shaft of the motor 109 and a photointerrupter PI1 disposed near the runner is mounted as shown in FIG. 8 to output one pulse signal to the opening of the slit as the runner rotates. The camera control circuit 106 constructs one zoom encoder as a so-called "incremental encoder" designed to count up the pulse signal output from the photointerrupter PI1 at the zoom-up time and count down the pulse signal at the zoom-down time.

If pulse count values ($C_{WIDE}$), ($C_{TELE}$) in the "wide position (fWIDE)" and "telescopic position (fTELE)" set as positions corresponding to the WIDE/TELE positions in the zoom operation by the above-described zoom encoder are determined, the present focal distance fNOW of the photographing lens TL1 can be detected based on the present pulse count number $C_{NOW}$.

Figure 9:
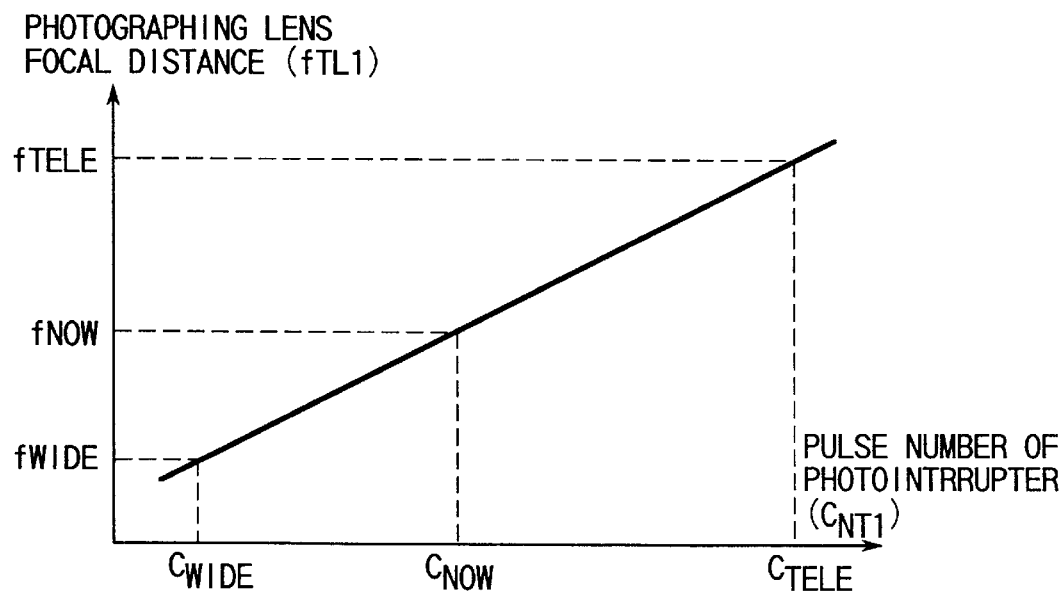
FIG. 9 is a graph showing the relation between the focal distance of a photographing lens and the number of pulses of a photointerrupter.

The graph of FIG. 9 shows the proportional relation between the focal distance f of the photographing lens and the pulse number C of the photointerrupter. Generally, since the pulse numbers $C_{WIDE}$, $C_{TELE}$ in the wide position fWIDE, telescopic position fTELE are set to different inherent values for each camera due to rattle occurring at the time of assembling process and dispersion of the precision of the parts, a preset adjustment becomes necessary. The adjustment effected in this invention is explained below.

The count values obtained as the result of adjustment for the precise wide position and telescopic position are hereinafter referred to as the "wide position pulse count value" and "telescopic position pulse count value", respectively.

In the above zoom driving control operation, each of the "wide position pulse count value" and "telescopic position pulse count value" is stored in the EEPROM 107 as one of the operation control data items inherent to the camera.

In the above example, particularly, a case wherein the zoom driving operation is explained as one of the operations of the camera using the motor 109 as the driving source, but it can be also used as a driving source of the camera for the film supplying operation and the lens driving operation for focusing. In such a case, inherent operation control data items necessary for the camera operations are stored in the EEPROM 107 as in the above-described case.

Further, the camera operation control operation also includes a "battery checking operation" and operation control data for battery checking is also stored in the EEPROM 107. As charging control data for the secondary battery, different data for each type of the battery to be used is used.

The camera control circuit 106 reads out the previously stored data from the EEPROM 107 when necessary and uses the readout data for the operation control of the camera and the charging control of the secondary battery.

The flash device 108 receives electric power directly from the secondary battery to effect the charging operation prior to the photographing operation of the camera in response to an instruction from the camera control circuit 106 and effect the flashing operation in synchronism with the photographing operation. The charging operation of the flashing device 108 requires a large current and imposes a heavy load on the secondary battery 103.

The motor 109 receives electric power directly from the secondary battery to effect preset operations of the camera such as the zooming, focusing and film supplying operations in response to an instruction from the camera control circuit 106. The motor 109 also requires a large current to effect the above operations and imposes a heavy load on the secondary battery 103 in the circuit.

Next, the "camera operation" and the "charging operation" of the camera with construction shown in FIG. 1 are explained. The camera control circuit 106 effects the control operation to inhibit the operation of charging the secondary battery 103 while the load means such as the battery checking circuit 104, DC/DC converter 105, flash device 108 and motor 109 are being operated.

If a power source (not shown) is connected to the charging terminal 101 in a charging inhibition state (i.e., in a state where the above load means is operated), the charging control circuit 102 transmits a "charging request signal" to the camera control circuit 106, but the camera control circuit 106 which has received the charging request signal continuously effects the operation of the load circuit without transmitting a "charging permission signal" to the charging control circuit 102. Therefore, the operation of charging the secondary battery 103 is not effected.

On the other hand, if an external power source (not shown) is connected to the charging terminal 101 in a state other than the charging inhibition state (i.e., in a state where the above load means is not operated), the charging control circuit 102 transmits a "charging request signal" to the camera control circuit 106. The camera control circuit 106 which has received the charging request signal inhibits the operation of the load circuit, and at the same time, transmits a charging permission signal to the charging control circuit 102. Then, the charging control circuit 102 which has received the charging permission signal starts the operation of charging the secondary battery 103.

The following control method other than the control method described above is also considered.

If an external power source (not shown) is connected to the charging terminal 101 in the charging inhibition state (i.e., in a state where the above load means is operated), the charging control circuit 102 transmits a "charging request signal" to the camera control circuit 106. The camera control circuit 106 which has received the charging request signal transmits a "charging permission signal" to the charging control circuit 102 after the preset operation of the load circuit is terminated or after it immediately terminates the operation of the load circuit. Thus, the charging control circuit 102 is permitted to effect the charging operation and starts to charge the secondary battery 103.

Further, if it becomes necessary to operate the load circuit during the operation of charging the secondary battery 102, the camera control circuit 106 immediately terminates the charging operation and operates the load circuit such as the flash device 108 and motor 109.

Thus, according to the first embodiment, the camera control circuit 106 exclusively effects the control operation (which is hereinafter referred to as exclusive control) to permit only one of the charging control circuit 102 and the load circuit to be operated, thereby making it possible to prevent occurrence of a problem that a large current flows in the charge control circuit 102 to damage the same.

(Modification 1)

In the construction shown in FIG. 1, only one motor 109 is shown, but a camera system having a plurality of motors for respective preset operations may be used, and even in this case, since the motors are treated as the same kind of load circuit by the secondary battery 103, they may be individually controlled. Further, as data items necessary for the camera operation and associated with the battery, for example, a remaining battery-capacity alarm voltage value, battery lock voltage value and overdischarge detection voltage value are also given, and the data items may be previously stored in the storage means and read out and adequately used when necessary. For example, at the time of photographing operation, the charging operation is interrupted, but the "battery checking" operation can be effected in the following order prior to the camera operation using the flash device 108 or motor 109 (cf. FIG. 2 and the graphs in FIGS. 4, 5).

(Step 1): First, the CPU 106 acting as the camera control circuit operates the battery checking circuit 104.

(Step 2): The battery checking circuit 104 detects the terminal voltage (which is hereinafter referred to as a "closed-circuit voltage") of the secondary battery 103 which is in operation by A/D-converting and quantizing the terminal voltage in the CPU 106 via an A/D line 124.

(Step 3): The CPU 106 compares preset "remaining battery-capacity alarm voltage" data stored in the EEPROM 107 with the closed-circuit voltage, and if the closed-circuit voltage is not lower than the preset remaining battery-capacity alarm voltage, it is determined that "the remaining battery capacity is sufficient" and the battery checking operation is terminated. At this time, for example, the battery checking operation is terminated by terminating the operation of the battery checking circuit 104. On the other hand, if the closed-circuit voltage is lower than the preset remaining battery-capacity alarm voltage, the following step is effected.

(Step 4): The CPU 106 compares "battery lock voltage" data stored in the EEPROM 107 with the closed-circuit voltage, and if the closed-circuit voltage is not lower than the battery lock voltage, it is determined that "the remaining battery capacity is insufficient" and a display of battery alarm is made for the user by use of a display unit (not shown), and then the battery checking operation is terminated. Also, at this time, the operation of the battery checking circuit 104 is terminated. On the other hand, if the closed-circuit voltage is lower than the battery lock voltage, it is determined that "there is no remaining battery capacity" and the operation of the camera system is terminated.

(Second Embodiment)

Figure 2:
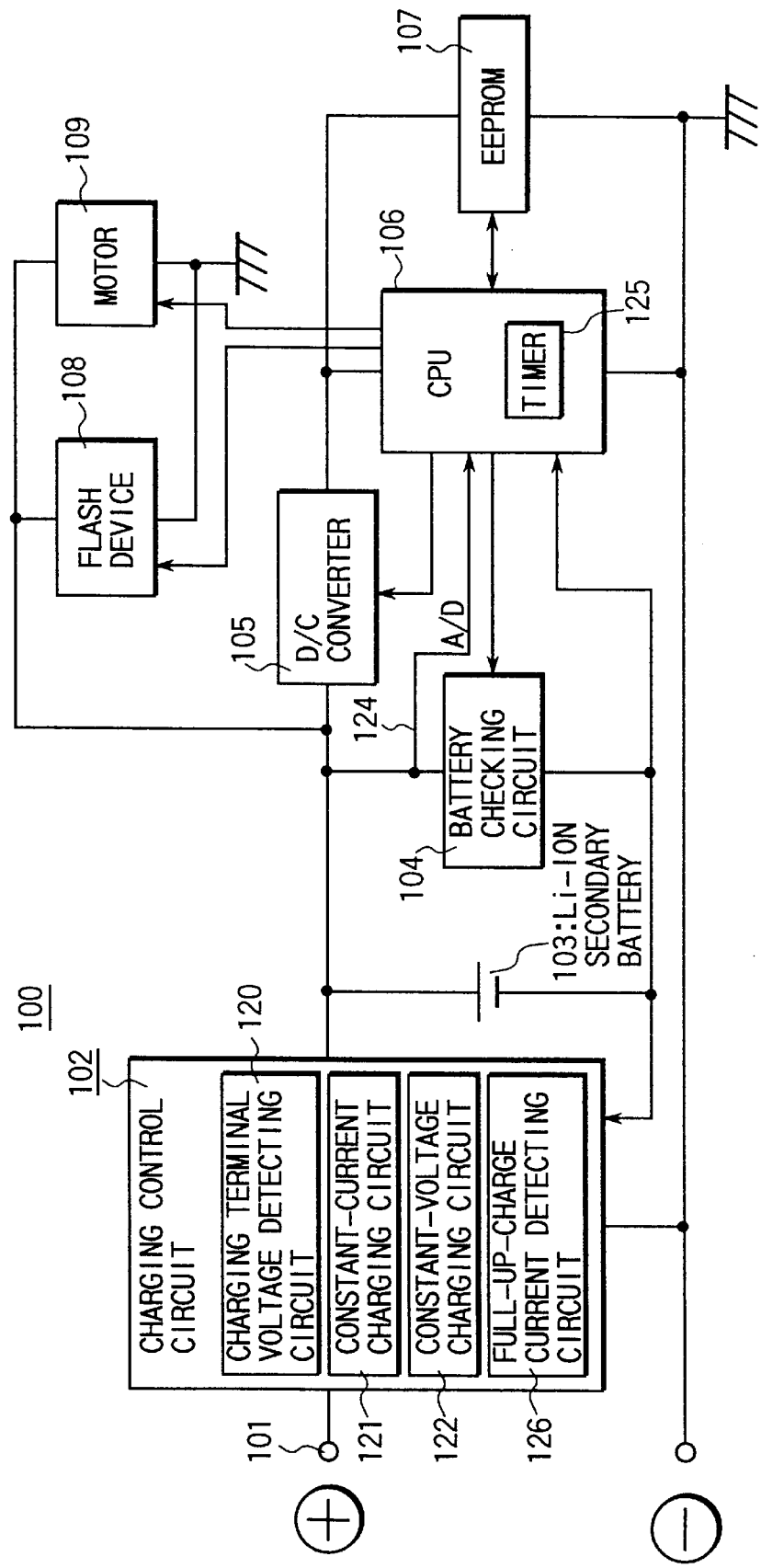
FIG. 2 is a block diagram showing the detail construction of a camera according to a second embodiment of this invention.

One example of the detail construction of a camera system according to a second embodiment of this invention is shown in FIG. 2. The basic construction of the camera of the second embodiment is slightly different from that of the first embodiment in its circuit construction and, for example, a CPU 106 used as a camera control circuit and having a timer 125 is connected to one end of a battery checking circuit 104 via a connection line (A/D line) 124, and a charging terminal voltage detecting circuit 120, constant-current charging circuit 121, constant-voltage charging circuit 122 and full-up-charge current detecting circuit 126 are provided as constituent elements of a charging control circuit 102. Further, in this embodiment, a camera using a secondary battery 103 which is formed of a Li-ion secondary battery is shown as an example. A method for using data stored in the EEPROM 107 in the basic construction of the camera shown in FIG. 1 is explained in detail below.

First, if the secondary battery 103 is a Li-ion secondary battery, generally, the "constant-current/constant-voltage charging" operation is effected in the operation of charging the secondary battery 103. In the "constant-current/constant-voltage charging" system, the charging operation of substantially 100% can be attained by first effecting the constant-current charging (which is hereinafter referred to as a "constant-current charging current") operation of a preset value until the terminal voltage of the secondary battery 103 becomes equal to or lower than a preset voltage (which is hereinafter referred to as a "constant-current/constant-voltage charging changeover voltage") and then effecting the preset voltage charging (which is hereinafter referred to as a "constant-voltage charging voltage") operation of a preset value for a preset period of time (which is hereinafter referred to as a "constant-voltage charging time"). Further, the full-up-charge can be more stably detected by determining that the charging current has become equal to or lower than a preset value (which is hereinafter referred to as a "full-up-charge determining current") (cf. the graph of FIG. 4).

A charging terminal voltage detecting circuit 120, constant current-charging circuit 121 and constant-voltage charging circuit 122 are provided in the charging control circuit 102. The charging terminal voltage detecting circuit 120 detects a voltage of an external power source (not shown) connected to the charging terminal 101, and if the detected voltage is a sufficiently high voltage (which is hereinafter referred to as a "chargeable power source voltage") for charging the secondary battery 103, it sets the constant-current charging circuit 121 and constant-voltage charging circuit 122 into the operable state and transmits a "charging request signal" to the camera control circuit 106. The "chargeable power source voltage" data is previously stored in the EEPROM 107 and compared with a value obtained by A/D converting and quantizing a voltage of the power source connected to the charging terminal 101, and if the chargeable state is detected, the CPU 106 transmits a charging permission signal to the charging control circuit 102 to start the charging operation.

In the initial period of the charging operation, the constant-current charging circuit 121 is operated to effect the constant-current charging operation. The "constant-current charging current" data is previously stored in the EEPROM 107 and the CPU 106 reads out the data to set a "constant-current charging current" amount in the constant-current charging circuit 121.

The charging amount of the secondary battery 103 can be detected by A/D converting and quantizing the terminal voltage in the CPU 106 via the A/D line 124. The CPU 106 interrupts the operation of the constant-current charging circuit 121 when the A/D converted terminal voltage of the secondary battery 103 has become equal to or higher than the "constant-current/constant-voltage charging changeover voltage", and at the same time, operates the constant-voltage charging circuit 122 to effect the constant-voltage charging operation. The "constant-current/constant-voltage charging changeover voltage" data is also previously stored in the EEPROM 107.

Further, the "constant-voltage charging voltage" data is stored in the EEPROM 107 and the CPU 106 reads out the data to set the constant-voltage charging voltage in the constant-voltage charging circuit 122.

Generally, since the "constant-current/constant-voltage charging changeover voltage" and the "constant-voltage charging voltage" are equal to each other, data items therefor in the EEPROM 107 commonly use one data.

When the operation mode is changed over to the constant-voltage charging operation, the CPU 106 activates the timer 125 to start the operation of counting the constant-voltage charging period. When the "constant-voltage charging period" has elapsed after the constant-voltage charging operation was started, the CPU 106 interrupts the operation of the constant-voltage charging circuit 122 and terminates the charging operation. The constant-voltage charging period data is also previously stored in the EEPROM 107.

Further, the full-up-charge can be more stably detected by additionally providing a full-up-charge current detecting circuit 126 in the charging control circuit 102 and determining that the charging current has become equal to or lower than the "full-up-charge determining current". Likewise, the "full-up-charge determining current" data is also previously stored in the EEPROM 107 and the CPU 106 reads out the data to set a "full-up-charge determining current" amount in the full-up-charge current detecting circuit 126.

In a camera system in which the secondary battery 103 is a Li-ion secondary battery, an overdischarge protection circuit and overcharge protection circuit are required in order to maintain the performance of the battery (e.g., the capacity and cycle characteristic). The overdischarge protection circuit is a protection circuit for preventing the terminal voltage of the Li-ion secondary battery 103 in the discharging state from becoming equal to or lower than a preset voltage (which is hereinafter referred to as an "overdischarge protection voltage"). The overcharge protection circuit is a protection circuit for preventing the terminal voltage of the Li-ion secondary battery 103 in the charging state from becoming equal to or higher than a preset voltage (i.e., an "overcharge protection voltage").

In the control operation in this embodiment, the closed-circuit voltage in the battery checking operation and the "overdischarge protection voltage" data stored in the EEPROM 107 are compared with each other, and if the closed-circuit voltage is not higher than the overdischarge protection voltage, it is determined that the Li-ion secondary battery 103 will be damaged if the discharging operation is continuously effected, and then the camera operation is interrupted.

Further, the terminal voltage in the charging operation and the "overcharge protection voltage" data stored in the EEPROM 107 are compared with each other, and if the terminal voltage is not lower than the overcharge protection voltage, it is determined that the Li-ion secondary battery 103 will be damaged if the charging operation is continuously effected, and then the charging operation is interrupted.

Thus, according to the second embodiment, the protecting operation is effected as the protecting operation of the overcharge/overdischarge circuit to protect the LI-ion secondary battery to be used and the overdischarge and overcharge which will damage the Li-ion secondary battery can be prevented.

(Modification 2)

Assuming that the overcharge voltage is set to substantially the same voltage value as the constant-voltage charging voltage, the same data can be stored as the above voltages in the EEPROM 107 and commonly used for the above voltages in order to save the adjustment data amount in the storage means.

(Third Embodiment)

Figure 3:
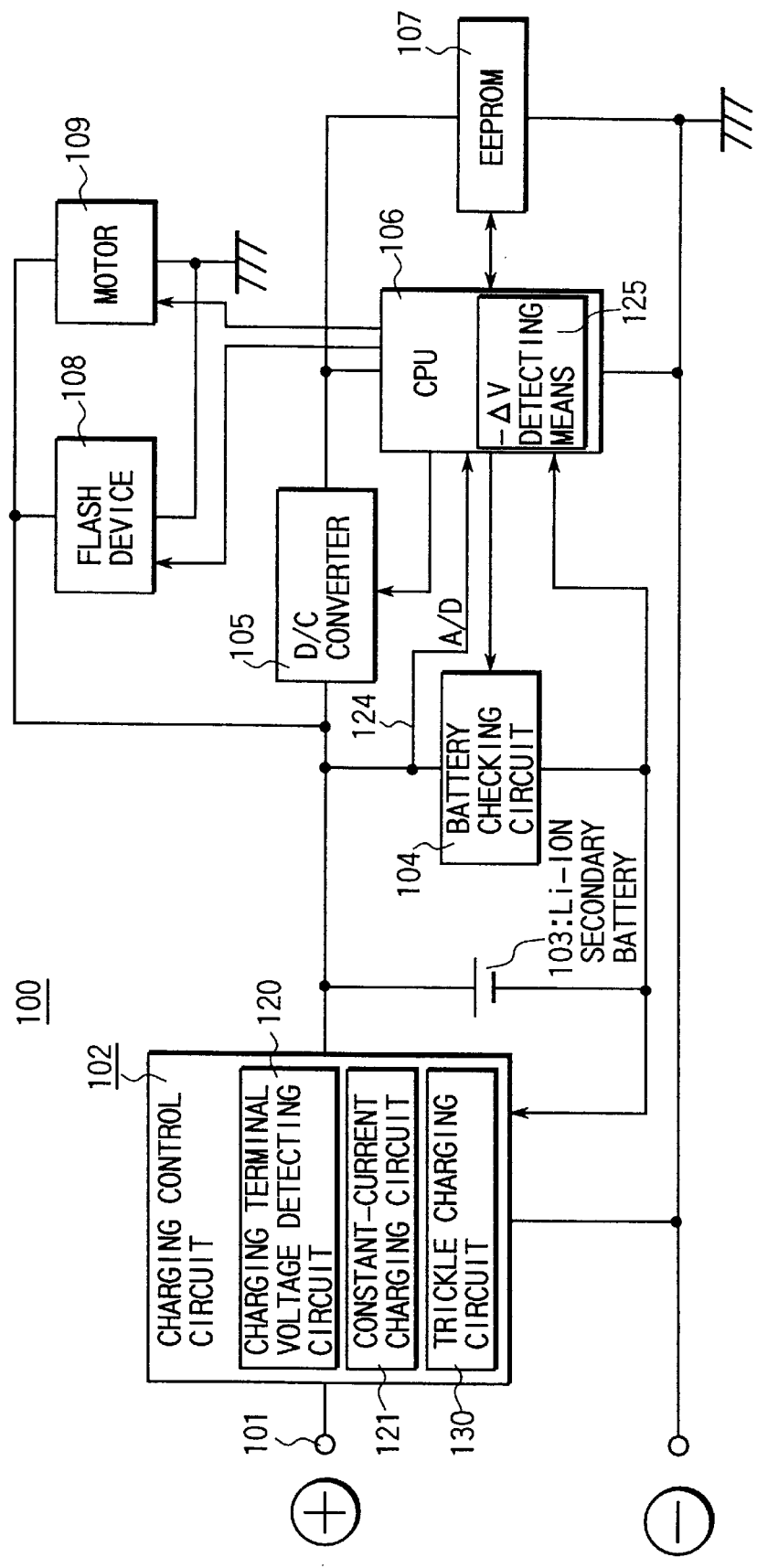
FIG. 3 is a block diagram showing the detail construction of a camera according to a third embodiment of this invention.
Figure 4:
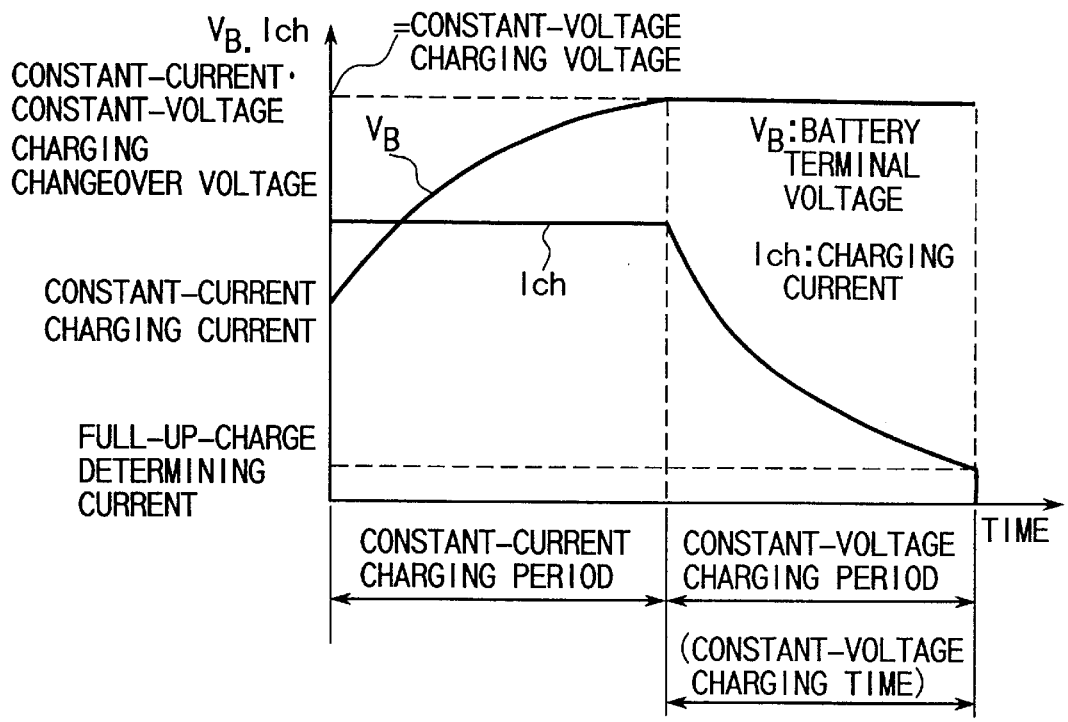
FIG. 4 is a graph showing the full-up-charge determining operation of a full-up-charge current detecting circuit.

FIG. 3 shows an example of the construction of a camera system according to a third embodiment of this invention. The basic construction of the camera of the third embodiment is basically equal to that of the second embodiment and is different from the latter in that the constant-voltage charging circuit and the full-up-charge current detecting circuit are omitted, a trickle charging circuit 130 is included in the charging control circuit 102 instead of them and $-\Delta V$ detecting means 125 which will be described later is included in a CPU 106.

In this example, a camera system in which the secondary battery 103 of FIG. 1 is formed of a Ni—Cd battery or Ni-hydrogen battery is shown by a block diagram. The charging operation of the secondary battery 103 is explained below with reference to FIG. 3.

If the secondary battery 103 of FIG. 1 is formed of a Ni—Cd battery or Ni-hydrogen battery, generally, the charging operation of "$-\Delta V$" system is effected. In the "$-\Delta V$" system, the terminal voltage of the secondary battery in the charging operation is monitored and the "$-\Delta V$" system is based on the characteristic that a variation amount "V" of the terminal voltage varies in a "+" direction, that is, increases until the terminal voltage almost reaches the full-up-charge voltage and then starts to vary in a "−" direction, that is, starts to decrease, and thus the charging operation can be rapidly effected. Determination of the full-up-charge state is made when the $-\Delta V$ detecting means 125 has detected that the terminal voltage of the secondary battery set in the charging operation is lowered by a preset voltage (e.g., "$-\Delta V$") from the peak voltage of the terminal voltage.

Figure 5:
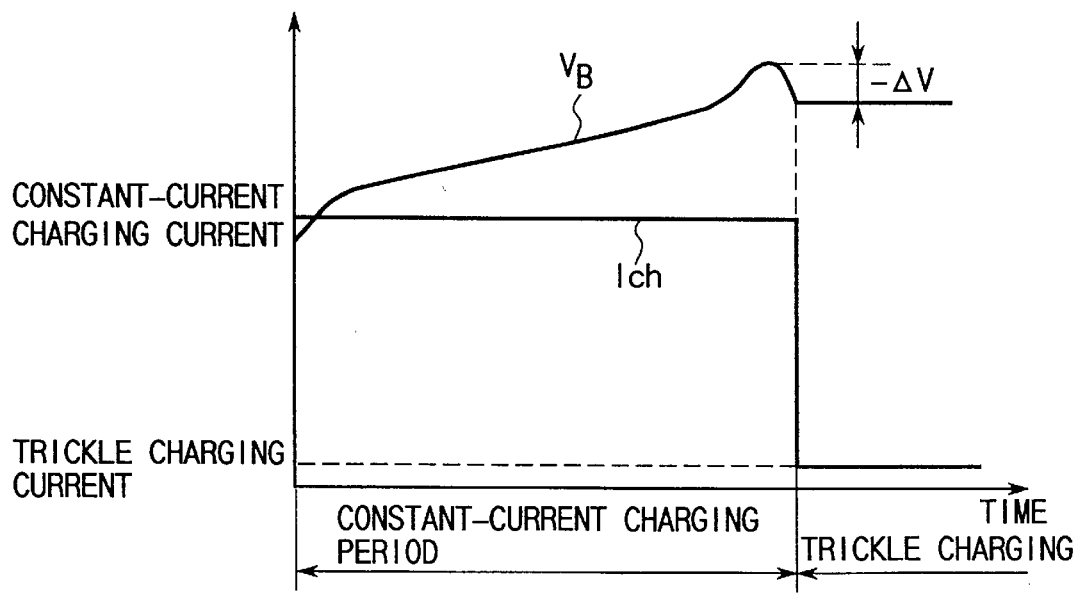
FIG. 5 is a graph showing the trickle charging operation of a trickle charging circuit.

In practice, the constant-current charging operation using a value of approx. 0.5 to 1.0 C is effected after starting the charging operation until "$-\Delta V$" is detected and then the operation mode is changed over to the "trickle charging" operation using a small value of approx. 0.05 C (cf. the graph of FIG. 5).

The charging control circuit 102 is mainly constructed by a charging terminal voltage detecting circuit 120, constant-current charging circuit 121 and trickle charging circuit 130 which will be described later.

The charging terminal voltage detecting circuit 120 detects a voltage of an external power source (not shown) connected to the charging terminal 101, and if the detected voltage is a sufficiently high voltage (which is hereinafter referred to as a "chargeable power source voltage") for charging the secondary battery 103, it sets the constant-current charging circuit 121 and trickle charging circuit 130 into the operable state and transmits a "charging request signal" to the camera control circuit 106.

Since the "chargeable power source voltage" data is previously stored in the EEPROM 107, the data can be compared with a value obtained by A/D-converting and quantizing the voltage of the power source connected to the charging terminal 101. In the chargeable state, the CPU 106 transmits a "charging permission signal" to the charging control circuit 102 and causes the same to start the charging operation.

In the initial period of the charging operation, the constant-current charging circuit 121 is operated to effect the constant-current charging operation. During the charging operation, the terminal voltage of the secondary battery 103 is A/D-converted and quantized and sequentially monitored in the CPU 106 via the A/D line 124.

The CPU 106 has $-\Delta V$ detecting means 131 provided therein to detect the peak voltage of the terminal voltage of the secondary battery 103 and detect a lowered voltage amount between the peak voltage of the terminal voltage and the present terminal voltage.

As shown in the graph of FIG. 5, the terminal voltage of the secondary battery 103 rises after starting the charging operation. It is understood from the characteristic curve in the graph that the rising rate of the terminal voltage of the secondary battery 103 becomes dull when the terminal voltage becomes substantially equal to the "full-up-charge" voltage and the terminal voltage is rapidly lowered after it has reached the peak value (maximum point). The peak voltage obtained at this time is stored, it is determined that the "full-up-charge" state is attained when a voltage amount ("$-\Delta V$") by which the terminal voltage is lowered from the peak voltage becomes equal to or larger than a preset value (which is hereinafter referred to as a "full-up-charge detecting voltage variation amount"), the operation of the constant-current charging circuit 121 is interrupted, and at the same time, the trickle charging circuit 130 is operated to start the trickle charging operation.

The data "$-\Delta V$", that is, "full-up-charge detecting voltage variation amount" data is previously stored in the EEPROM 107 and is read out and used by the CPU 106. Generally, the trickle charging circuit 130 is designed to stop its operation after the passage of adequately determined preset time.

Data items associated with the "constant-current charging current" and "trickle charging current" are also stored in the EEPROM 107 as in the case of the LI-ion secondary battery, and the CPU 106 reads out the data to set the "constant-current charging current" amount and "trickle charging current" amount in the constant-current charging circuit 121 and trickle charging circuit 130, respectively.

Thus, according to the third embodiment, since whether the full-up-charge state is reached or not can be determined by detecting a point at which the terminal voltage is slightly lowered from the preset peak voltage in the charging control operation, the constant-current charging operation using a large current can be interrupted and the trickle charging operation using a small current can be automatically started instead of the above constant-current charging operation.

(Other Modifications)

In addition, for example, it is possible to further provide overcharge protection means and overdischarge protection means for the secondary battery and store operation data of each protection means in the storage means. Further, the battery lock voltage must be set to a voltage higher than the overdischarge protection voltage, but the same data can be stored as the above voltage data in the EEPROM 107 and commonly used for the above voltage data in order to save the adjustment data amount, for example. Further, the above means for effecting the control operations are not limited to hardware means and may be constructed by use of softwares using preset programs.

This invention can be variously modified without departing from the technical scope thereof.

Further, the following inventions are mainly included in this specification.

That is, there is provided a camera using a secondary battery as a power source, comprising charging means for charging the secondary battery with electric energy supplied from an external power source provided on the exterior of the camera; load means driven by use of the electric energy of the secondary battery charged by the charging means; and control means for exclusively driving and controlling the charging means and load means.

There is provided a camera which includes a charging control circuit for charging a secondary battery; and a camera control circuit for controlling the operation of the camera and the charging control circuit; wherein the charging control circuit transmits a charging request signal to the camera control circuit when an external power source for charging the secondary battery is attached and the camera control circuit effects the control operation to permit the secondary battery to be charged if a preset device is not operated when the charging request signal is received.

(Effects of this Invention)

According to the camera of this invention described above, the following effects can be attained.

1) Since a circuit such as a flash device or motor in which a large load current flows is not operated during the operation of the charging control circuit, occurrence of damage to the charging control circuit by passing a large current in the charging control circuit can be prevented.

2) The system construction of a memory, for example, and the adjusting process can be simplified by commonly using the same storage location for adjustment data associated with the charging control operation for the secondary battery and adjustment data associated with the camera operation.

3) The construction of the camera system can be simplified by effecting the charging control operation for the secondary battery and the control operation for the camera operation by use of a single control circuit.

4) Adjustment of the full-up-charge voltage in the manufacturing process can be simplified and the charging circuit itself can be simply formed by storing adjustment data associated with the charging control operation for the secondary battery in the storage means such as an EEPROM and making a fine adjustment.

5) Since it can be determined that the full-up-charge state is reached in the charging control operation, the operation of switching from the constant-current charging operation to the trickle charging operation can be automatically effected.

Thus, according to this invention, it is possible to realize a camera in which the size can be made small, the charging control circuit can be protected and the precision of a specified voltage of the protection circuit on the secondary battery side can be made high and provide a camera using a secondary battery in which the cost can be lowered and the manufacturing process and adjusting process after the manufacturing process can be more simplified in comparison with the conventional case.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

I claim:

1. A camera using a secondary battery, comprising:

charging means for charging the secondary battery with electric energy supplied from an external power source provided on an exterior of the camera;

load means driven by use of the electric energy of the secondary battery charged by said charging means; and control means for exclusively driving and controlling said charging means and said load means by outputting a charge controlling signal for controlling said charging means and an operation signal for driving said load means.

2. A camera using a secondary battery, comprising:

charging means for charging the secondary battery with electric energy supplied from an external power source provided on an exterior of the camera;

load means driven by use of the electric energy of the secondary battery charged by said charging means;

control means for exclusively driving and controlling said charging means and said load means; and storage means for storing control data used for controlling said charging means and said load means.

3. A camera according to claim 2, wherein said control means includes means for inhibiting operation of one of said charging means and said load means while driving the other of said charging means and said load means based on said control data stored in said storage means.

4. A camera using a secondary battery as a power source, comprising:

a driven element driven by use of electric energy of the secondary battery;

a charging control circuit for controlling electric energy supplied from an external power source and charging the secondary battery with the electric energy; and control means for inhibiting the charging operation of said charging control circuit while said driven element is being driven and causing the charging operation to be effected by said charging control circuit based on a preset condition while said driven element is not driven.

5. A camera according to claim 4, wherein said charging control circuit outputs a charging request signal to said control means when the external power source is connected to the secondary battery and said control means neglects the charging request signal and drives said driven element if the driven element is being driven.

6. A camera according to claim 4, wherein said charging control circuit outputs a charging request signal to said control means when the external power source is connected to the secondary battery and said control means starts the charging operation based on the charging request signal and inhibits the operation of said driven element.

7. A camera using a secondary battery as a power source, comprising:
   a driven section driven by use of electric energy of the secondary battery;
   a charging circuit capable of charging the secondary battery with electric energy supplied from an external power source, for outputting a charging request signal when the external power source is connected to the secondary battery;
   detecting means for detecting a charging voltage of the secondary battery; and
   control means for neglecting the charging request signal and inhibiting the charging operation of said charging circuit while said driven section is being driven and controlling the charging operation of said charging circuit based on an output of said detecting means if said driven section is not driven.

8. A camera according to claim 7, further comprising a secondary battery used for the camera; and storage means storing control data used for controlling said charging means and load means.

9. A camera according to claim 8, wherein said storage means stores a charging configuration inherent to the secondary battery used and the charging time thereof.

10. A camera according to claim 7, wherein said charging circuit includes a constant-current charging circuit and a constant-voltage charging circuit.

11. A camera according to claim 10, wherein the constant-current charging operation is effected by said constant-current charging circuit until a preset voltage value is reached and the charging operation is effected with a constant voltage for a preset period of time by said constant-voltage charging circuit after the voltage value has been reached in a case where the secondary battery used is a lithium battery.

12. A camera according to claim 7, wherein said charging circuit includes a constant-current charging circuit and a trickle charging circuit.

13. A camera according to claim 12, wherein the constant-current charging operation is effected by said constant-current charging circuit and the charging operation is effected by said trickle charging circuit after a voltage is lowered from the maximum voltage value by a preset amount in a case where the secondary battery used is one of a nickel-cadmium battery and a nickel-hydrogen battery.

14. A camera using a secondary battery, comprising:

a charging control circuit for charging the secondary battery; and
a camera control circuit for controlling the operation of the camera and said charging control circuit;
wherein said charging control circuit transmits a charging request signal to said camera control circuit when an external power source for charging the secondary battery is attached and said camera control circuit effects the control operation to permit the secondary battery to be charged if a preset device is not operated when the charging request signal is received.

15. A camera according to claim 14, wherein said preset device includes at least one of a flash device, a battery checking circuit for checking the battery condition of the secondary battery, a DC/DC converter circuit for raising a voltage supplied to said camera control circuit when a voltage supplied from the secondary battery to said camera control circuit is lowered, a lens driving device for driving a lens of the camera, and a film supplying device for supplying a film.

16. A camera using a secondary battery, comprising:
   a charging control circuit for charging the secondary battery; and
   a camera control circuit for controlling the operation of the camera and said charging control circuit;
   wherein said charging control circuit transmits a charging request signal to said camera control circuit when an external power source for charging the secondary battery is attached and said camera control circuit effects the control operation to permit the operation of a preset device to be continuously effected without charging the secondary battery if the preset device is being operated when the charging request signal is received.

17. A camera according to claim 16, wherein said preset device includes at least one of a flash device, a battery checking circuit for checking the battery condition of the secondary battery, a DC/DC converter circuit for raising a voltage supplied to said camera control circuit when a voltage supplied from the secondary battery to said camera control circuit is lowered, a lens driving device for driving a lens of the camera, and a film supplying device for supplying a film.

18. A camera using a secondary battery, comprising:
   a charging circuit for charging the secondary battery;
   a flash device: and
   a control device for inhibiting the charging operation of said charging circuit while said flash device is being operated.

19. A camera using a secondary battery, comprising:
   a charging circuit for charging the secondary battery;
   a battery checking circuit for checking the battery condition of the secondary battery: and
   a control device for inhibiting the charging operation of said charging circuit while said battery checking circuit is being operated.

20. A camera using a secondary battery, comprising:
   a charging circuit for charging the secondary battery;
   a DC/DC converter circuit for raising a voltage supplied from the secondary battery: and a control device for inhibiting the charging operation of said charging circuit while said DC/DC converter circuit is being operated;

wherein said DC/DC converter circuit raises a voltage supplied from the secondary battery to said control circuit when the supplied voltage is lowered.

21. A camera using a secondary battery, comprising:

a charging circuit for charging the secondary battery;

a lens driving device for driving a lens of the camera: and a control device for inhibiting the charging operation of said charging circuit while said lens driving device is being operated.

22. A camera using a secondary battery, comprising:

a charging circuit for charging the secondary battery;

a film supplying device for supplying a film: and a control device for inhibiting the charging operation of said charging circuit while said film supplying device is being operated.

* * * * *